United States Patent [19]
Toole

[11] Patent Number: 5,839,772
[45] Date of Patent: Nov. 24, 1998

[54] CARRYING BIN WALL EXTENDER

[76] Inventor: Bruce B. Toole, 323 Pine Needle Dr., Hampstead, N.C. 28443

[21] Appl. No.: 721,218

[22] Filed: Sep. 26, 1996

[51] Int. Cl.[6] ................................................ G62D 27/00
[52] U.S. Cl. .............................. 296/32; 291/50; 291/36; 280/47.18; 280/47.31
[58] Field of Search ................... 296/3, 32, 36, 296/50; 280/47.18, 47.31; 256/26, 47, 54

[56] References Cited

U.S. PATENT DOCUMENTS

| | | | |
|---|---|---|---|
| D. 269,335 | 6/1983 | Eubanks | D12/24 |
| D. 311,084 | 10/1990 | Batchelor | D34/27 |
| 1,716,611 | 6/1929 | Wilson | 280/60 |
| 2,711,342 | 6/1955 | Selzer | 296/32 |
| 2,720,414 | 10/1955 | Hart | 296/12 |
| 2,731,238 | 1/1956 | French et al. | 256/26 |
| 2,768,022 | 10/1956 | Pope | 296/27 |
| 2,805,885 | 9/1957 | Elzea | 296/36 |
| 3,161,434 | 12/1964 | Jerpbak | 296/36 |
| 3,785,695 | 1/1974 | Conkle | 296/50 |
| 3,870,367 | 3/1975 | O'Brien | 298/1 B |
| 4,095,838 | 6/1978 | Beeler | 296/26 |
| 4,585,264 | 4/1986 | Miller | 296/3 |
| 4,645,225 | 2/1987 | Eubanks | 280/47 |
| 4,824,157 | 4/1989 | Nielsen et al. | 296/100 |
| 5,310,238 | 5/1994 | Wheatley | 296/100 |
| 5,374,095 | 12/1994 | Ramseth | 296/32 |
| 5,509,709 | 4/1996 | Carroll | 296/3 |

OTHER PUBLICATIONS

Brookstone Tool Catalog, Winter 1996, p. 61.
The Safety Zone Catalog, Fall 1996, p. 2.

*Primary Examiner*—Gary C. Hoge
*Attorney, Agent, or Firm*—Michael E. Mauney

[57] ABSTRACT

An attachment to increase the capacity of the carrying bin of a utility cart or of a wheelbarrow includes a plurality of frames with a barrier in the frames and with the frames removably connected to the carrying bin. A portion of the attachment will open at an end of the carrying bin providing for easy loading and unloading of the carrying bin. The frames connect to each other by slots that provide for the attachment to adjust to different sized carrying bins. The frames are easily removed when the extra bin capacity provided by the attachment is not needed.

13 Claims, 6 Drawing Sheets

FLAT SPOT

CARRYING BIN WALL EXTENDER

BACKGROUND OF THE INVENTION

1. Field of Invention

This invention relates to an attachment to be used with moveable carriers for articles. One such carrier is the consumer item known as a wheelbarrow. Another carrier which is used to carry articles is a utility cart. Utility carts are usually hitched to a riding lawn mower or home tractor. The bin used for carrying utilities in a utility cart or wheelbarrow is usually rectangular in shape. A wheelbarrow or a utility cart may be unloaded by tipping at one end. More particularly, this invention relates to an apparatus which will fit above a bin on a wheelbarrow or utility cart to provide higher walls for the bin, to increase the load-carrying capability of the bin, which is easily attached and detached from the bin, easily loaded and unloaded when in place, and which adjusts to fit different sized and shaped bins.

2. Description of Background Art

There is a need both in home and commercial applications for a wheeled tool which allows one to transport bulky or heavy loads. The most commonly used tool to accomplish this purpose is called a wheelbarrow. Typically, a wheelbarrow consists of one or two front wheels, two support legs mounted at the back of the wheelbarrow, handles extending backward from the wheelbarrow which the user lifts to roll the wheelbarrow and a bin. Typically, the bin of the wheelbarrow in which loads are placed is roughly rectangular in shape. Sometimes at the front of the wheelbarrow bin the shape may be somewhat trapezoidal or rounded. The bin of the wheelbarrow has sides that slope inward so that the dimensions of the bottom portion of the wheelbarrow bin are not as large as the open upper rim of the wheelbarrow bin. Utility carts, usually towed behind lawn tractors, are also used to transport loads. Their carrying bin, like a wheelbarrow bin, is roughly rectangular in shape.

Although there are specially designed wheelbarrows designed to move particular kinds of loads, most wheelbarrows are designed to have the widest possible utility in transporting a variety of materials within the wheelbarrow bin. A wheelbarrow with a deep bin and high sides would be most useful for transporting bulky but light loads. However, such sides would be inappropriate for transporting and dumping smaller, heavier loads. Therefore, the sides of a wheelbarrow are designed to strike a compromise between the ideal size for carrying and unloading light, bulky loads and the ideal size for carrying and unloading small, heavy loads. However, when transporting light, bulky loads in a wheelbarrow, such as leaves, mulch, or the like, the weight carrying capacity of the wheelbarrow exceeds the volume capacity of the bin. There is therefore a temptation on the part of the user to overload the bin, so that part of the load may shift and spill out of the wheelbarrow while in use. To overcome this problem and to increase the capacity of a standard wheelbarrow for transporting light, bulky loads, a number of devices have been devised. For example, a rigid, molded plastic enlargement insert for a wheelbarrow is seen in U.S. Pat. No. 4,645,225 issued to Eubanks. This discloses a plastic insert formed of multiple sections to fit within the wheelbarrow bin and thereby increasing the carrying capacity of the wheelbarrow. Rigid devices such as disclosed in the Eubanks patent typically will fit only one size wheelbarrow bin and are difficult to attach and difficult to break down for storage. Additionally, the rigid sides of these inserts can make dumping the contents of the wheelbarrow difficult.

An alternative to rigid wheelbarrow attachments which increase the volumetric capacity of a wheelbarrow are also seen, such as U.S. Pat. No. 3,870,367 issued to O'Brien. This patent discloses a rope or net superstructure suspended on poles attached to the corners of the wheelbarrow bins. A different approach is seen in U.S. Pat. No. 5,374,095 issued to Ramseth. This discloses a sidewall extension apparatus which extend the side walls of the wheel well by lifting or attaching a flexible barrier attached along the outside of the rim of the wheelbarrow bin. The barrier attaches on a bracket which abuts the walls of the wheelbarrow bin. Both the Ramseth and O'Brien patents are not readily adopted to fit different sized wheelbarrow bins and present difficulties in emptying the wheelbarrow in a convenient way when loaded. Usually wheelbarrows are unloaded by tipping them forward on the front wheel until the front edge of the bin contacts the ground. Ordinarily, wheelbarrow bins slope toward the ground from the back or handle end of the wheelbarrow to the front or wheeled end and the interior of the wheelbarrow bin has sides that slope inward to a bottom portion that may be slightly sloped from the back of the bin to the front and somewhat smaller than the open top of the wheelbarrow bin. These features facilitate a load sliding from the back of the wheelbarrow bin across the bottom of the wheelbarrow bin and out front of the wheelbarrow bin. However, in both rigid wheelbarrow inserts as seen in U.S. Pat. No. 4,645,225 (Eubanks) and side extenders as seen in U.S. Pat. Nos. 3,870,367 (O'Brien), 5,374,095 (Ramseth) do not dump their loads as easily as is the case with the wheelbarrow without these attachments or inserts. This is illustrated in FIG. 1. The high sides of the prior art extenders which are fixed at the front of the wheelbarrow bin prevent a sufficient gravitational force from acting on the load contained within the wheelbarrow bin so that it will easily slide out of the front of the wheelbarrow bin and across the extended front part of the bin as modified by the above patents without the use of a tool or the help of a second person.

Many homeowners may now have a standard wheelbarrow with a metal bin, a newer design wheelbarrow constructed of molded plastic, and a utility cart. In each case there may be a need for a device which increases the capacity of the carrying bin when transporting light and bulky loads. Therefore, a need exists for a device which extends the walls of the bin, which can be easily attached and detached from one device and moved to another, which can be easily adjusted to fit different shapes and sizes of bins, and which facilitates loading and unloading of light bulky loads of a wheelbarrow or utility cart when in use.

SUMMARY OF THE INVENTION

The present invention is an apparatus for extending the walls of the carrying bin and thereby increasing the volumetric capability of the bin, which easily attaches and detaches from a bin, which adjusts to different sizes and shapes of bins, and which has gates which easily open and close to facilitate loading and unloading materials from the bin. It may be used with either a wheelbarrow or utility cart bin.

The present invention is constructed of a plurality, usually five, extender walls that are connected to each other during assemblage and attachment to the bin. Each individual extender wall consists of a bottom and top support beam that may be constructed of any convenient durable material, including pipe, metal bar stock, rigid plastic, or wood. The upper and lower beams are connected by at least two perpendicular support beams. This forms a roughly rectangular frame on which a net, wire screen, plastic screen, or the like will be affixed to form a wall. The lower beam of three of the extender walls will be affixed to respectively the rim of the bin at the rear or handle end and the two sides of the wheelbarrow bin. At the corners of the extender walls there are means for connecting them which allow for adjustments. Ordinarily, this can be accomplished by a slot arrangement at the ends of the extender beams for connectors like screws or bolts. For example, a six-inch slot will allow several inches of variation in the point of connection. Most bins have relatively small variations in the size of the bin. The volume of the bin and the weight of what is carried within the bin depend exponentially on the dimensions of the bin. Therefore, adding a few inches to the bin results in a relatively large increase in the volume and the weight of items that could be carried within the wheelbarrow. Therefore, there is relatively small variation in the dimensions of most bins that are seen in the marketplace, especially those used in home applications. Most bins have a width between 25 and 28 inches and a length between 35 and 39 inches. Therefore, relatively small slots will allow sufficient variation in the effective length and width of the extender walls to adjust to fit the vast majority of bins seen in the marketplace. At the front of the bin there will be two extender walls which will be attached to the front of the side extender walls by a hinge arrangement. This will allow for some adjustment for bins of varying lengths. The front of different bins are occasionally shaped differently. Some bins are a simple square, others have a rounded shape in front, still others have a trapezoidal or triangular shape at the front. The two extender walls mounted at the front may be folded to attach together at an angle. By varying the point of connection between the two, the invention may be adjusted to fit different shapes of bin fronts.

Additionally, these two front extender walls will attach and detach from their point of connection to each other easily. This allows the front of this invention to be opened for easy loading and unloading. Typically, a wheelbarrow is unloaded by lifting it from the rear and tipping it forward allowing its load to slide out of the front of the wheelbarrow. A utility cart may be unloaded by unhitching it from a lawn tractor and tipping it to the end opposite of the tongue used to hitch it to the lawn tractor. By disconnecting the two front extender walls and moving them back to connect along one of the side extender walls, one side of the invention is open so that the carrying bin may be unloaded by tipping it in the usual way.

The device may be attached to the rim of the carrying bin in a number of possible ways. Where it is desired to make the attachment relatively permanent, holes may be drilled in the rim and the device attached by means of bolt and nut arrangement, or self-tapping screws, or the like. For a removable attachment, metal or plastic clips could be utilized. Additionally, most rims in a carrying bin are constructed by rolling the rim back upon itself forming a roll-like rim. This allows attachment by means of a hook which fits around the roll like rim which can be tensioned for attachment in a number of ways, including screw like threads on the hook, spring loaded mounting, and the like. It is believed this manner of attachment is too easily detached while in use for most applications. Because the device is built from a number of components which are attached in a hinged fashion, it may be folded without disassembly into a relatively compact and easily stored shape.

Thus, it is seen it is an object of the invention to provide a means for easily extending the side walls of a carrying bin of a wheelbarrow or utility cart, thus greatly increasing the storage capacity of the carrying bin. It is further object of the invention to adjust to fit different sized bins. It is a further object of the invention to easily attach and detach from the bin. It is a further object of the invention to have a front portion that adjusts to fit different shaped bins and easily opens and closes to allow convenient loading and unloading of the carrying bin.

DETAILED DESCRIPTION OF DRAWINGS

Wheelbarrows are much more common on home uses than are utility carts. Therefore, the drawings are directed toward the wheelbarrow embodiment of this invention. But it will be appreciated by one of skill in the art that this invention is readily used on a utility cart without the need to modify the invention in any substantial way.

Figure 1:
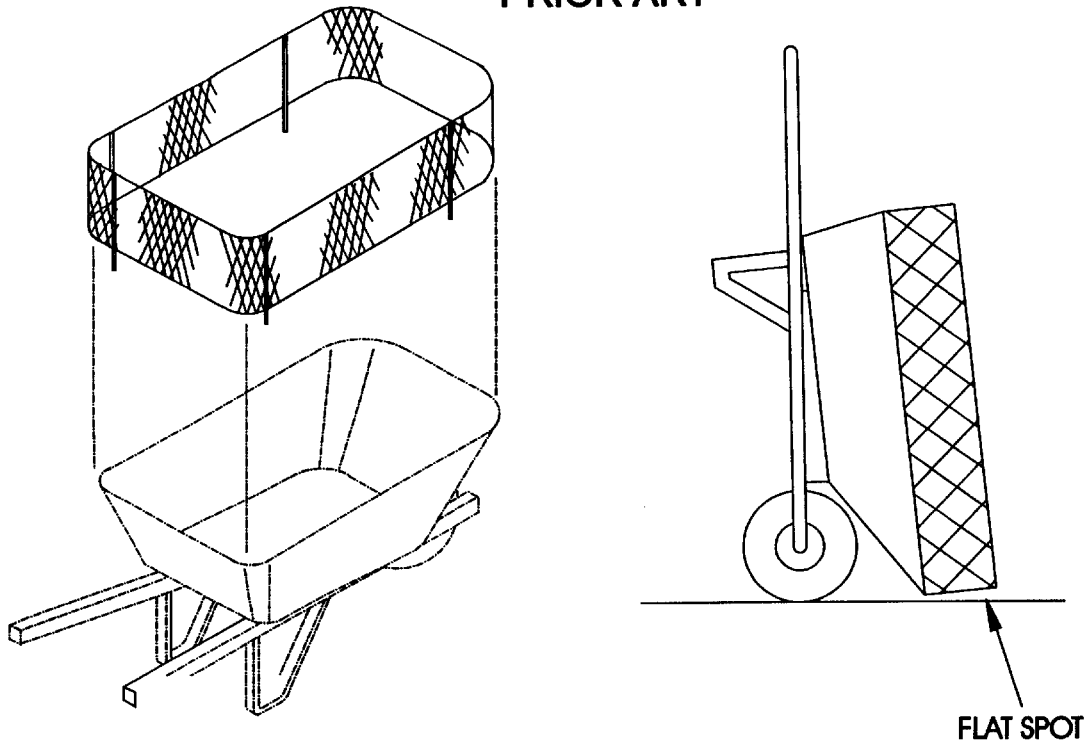
FIG. 1 shows the prior art and illustrates difficulties in unloading a wheelbarrow equipped with prior art wall extenders or rigid bin attachments.
Figure 1:
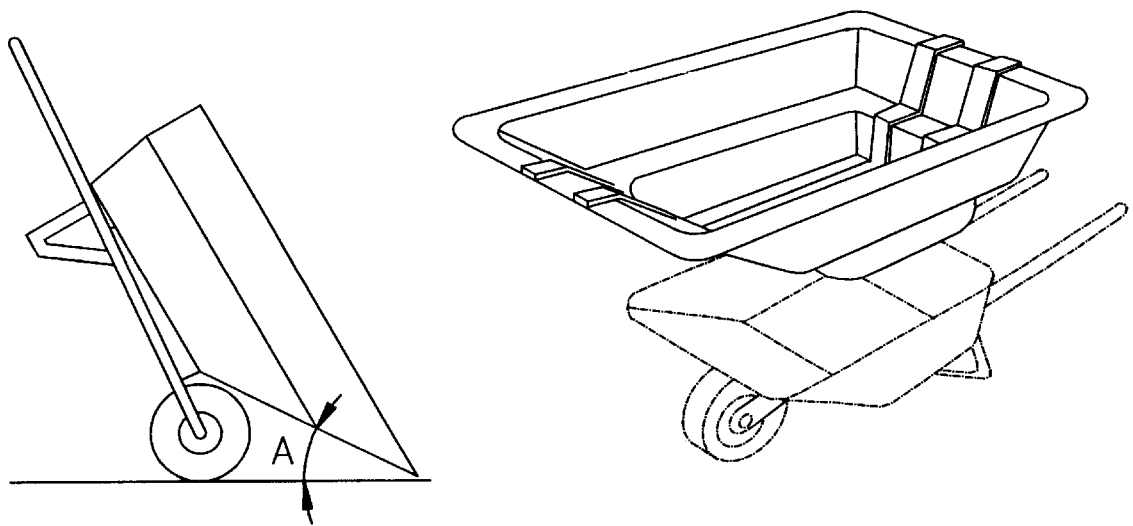

FIG. 1 illustrates two examples of the prior art. One is a rigid wheelbarrow bin attachment which fits into the bin of the wheelbarrow and provides higher sides. The other is an attachment to go on the rim of a wheelbarrow which extends upward on the wheelbarrow bin increasing the volumetric capacity. However, whether one is using either of these two prior art embodiments, a problem arises whenever there is an attempt to unload the wheelbarrow. This is illustrated by FIG. 1. This is typically accomplished by tipping the wheelbarrow forward on its wheel until the load by force of gravity slides out of the front of the wheelbarrow bin. However, when one extends the wheelbarrow bin, whether at an angle or at a line perpendicular to the ground, it makes unloading of the wheelbarrow more difficult. If the walls of the wheelbarrow bin are extended parallel to the wheelbarrow rim walls, then this reduces the amount of angle (A) between the bottom of the bin and the ground. This means that the force of gravity will not be sufficient to unload the wheelbarrow without holding the wheelbarrow in place while using another tool, such as a rake, stick, or obtaining help from another person to force the contents of the wheelbarrow out of the front of the wheelbarrow. Where the wheelbarrow wall extenders are at an angle perpendicular to the ground, then a "flat" spot is created. The force of gravity will force the contents of the wheelbarrow bin down the sloped sides of the wheelbarrow, but when it encounters the flat spot the wheelbarrow will not completely unload without the use of some further tool or help from another person. It is an object of the present invention to overcome this deficiency in the prior art.

Figure 2:
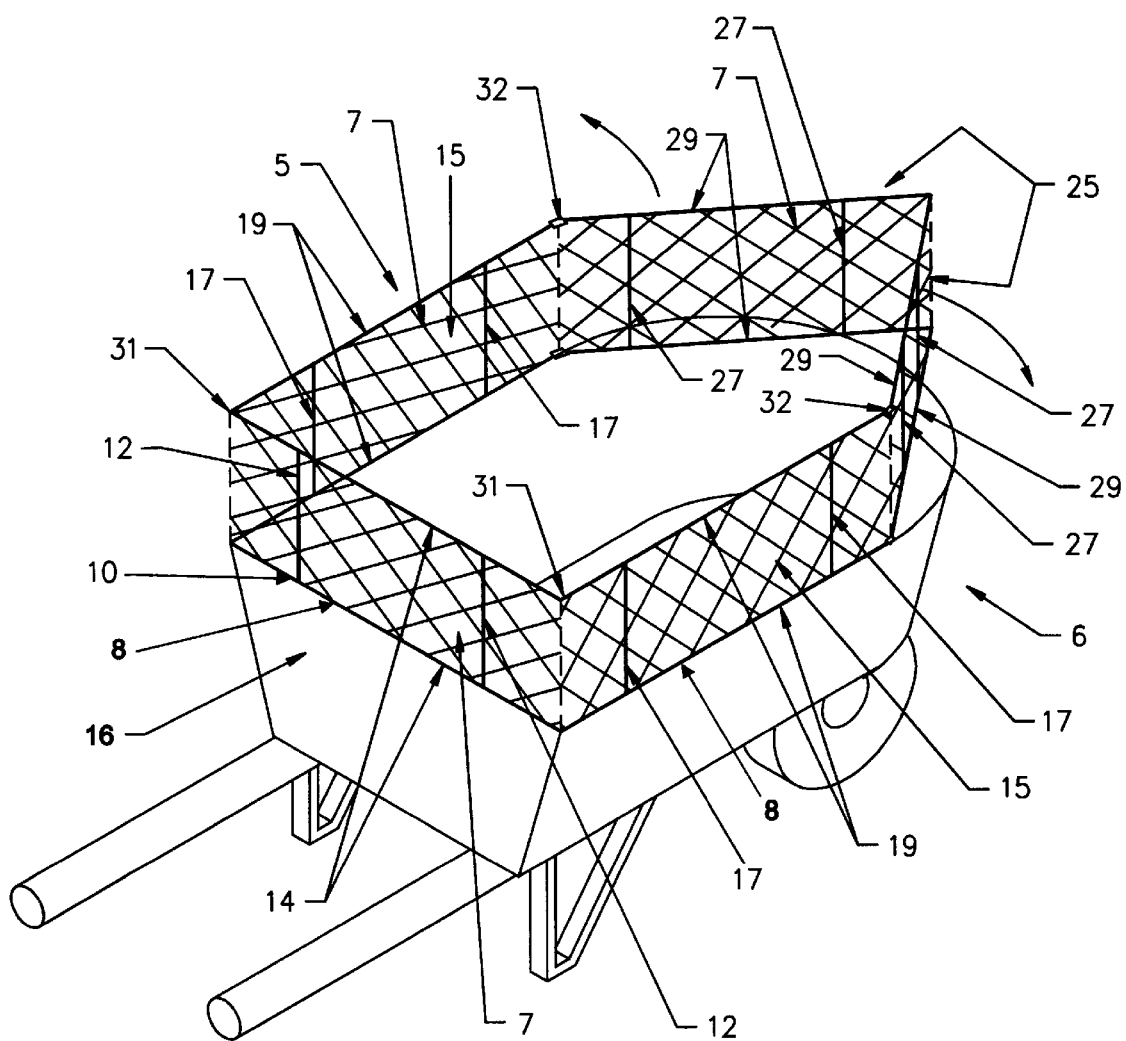
FIG. 2 shows the present invention mounted on a wheelbarrow with the front gate extender walls in the closed and fastened position.

FIG. 2 shows the wheelbarrow wall extender (5) when mounted on a wheelbarrow (6). The wheelbarrow wall extender consists of five separate rectangular frames. At the rear or handle end (16) of the wheelbarrow (6), the rear wheelbarrow extender wall (10) is attached to the wheelbarrow rim (8). It is constructed of four beams. There are two vertical parallel beams (12) which connect to two horizontal parallel beams (14). These form the rectangular frame on which a wire screen or fabric netting (7) is mounted making a wall. There are also two side extender walls (15) which are of the same dimensions. They are constructed of two vertical beams (17) attached to the horizontal beams (19), thus forming two roughly rectangular wheelbarrow extender walls. They are attached to the rear wheelbarrow extender beams at the corners (31). The means of attachment will be shown in detail in drawing 3 and 3(a). The bottom horizontal beams are attached to the rim (8) of the wheelbarrow. There are two front gate extender walls (25) which are constructed of two vertical beams (27) attached to two horizontal beams (29). These front gate extender walls (25) are attached to the side extender walls (15) at the corners (32) by a hinge arrangement. The precise means of attachment are shown in drawing 4 and 4(a). The rear wheelbarrow extender walls (10), the two side wheelbarrow extender wall (15), and the two front gate extender walls (25) are all constructed in a roughly rectangular shape with the interior of the rectangular filled with a wire screen or fabric mesh material (7). The two side extender walls (15) are attached to the side of the wheelbarrow rim and the rear extender wall (10) is attached to the rear of the wheelbarrow rim. The front gate extender walls (25) are not attached to the wheelbarrow rim, but are removably attached to each other so that they may open and close as is shown by the directional arrows. This removable attachment is shown in detail in drawing 4(b)

Figure 3:
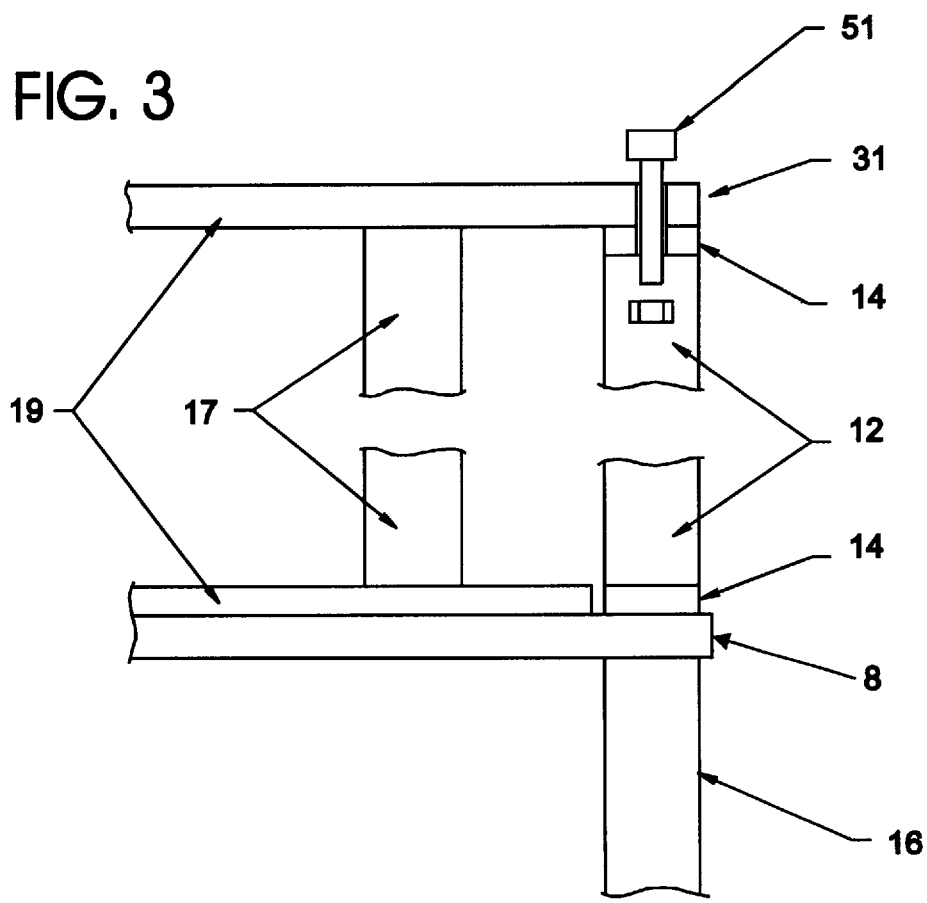
FIG. 3 and FIG. 3(a) shows the width adjusting slots and the means of connecting the width adjusting slots in the rear extender beam to the side extender beams.
Figure 3A:
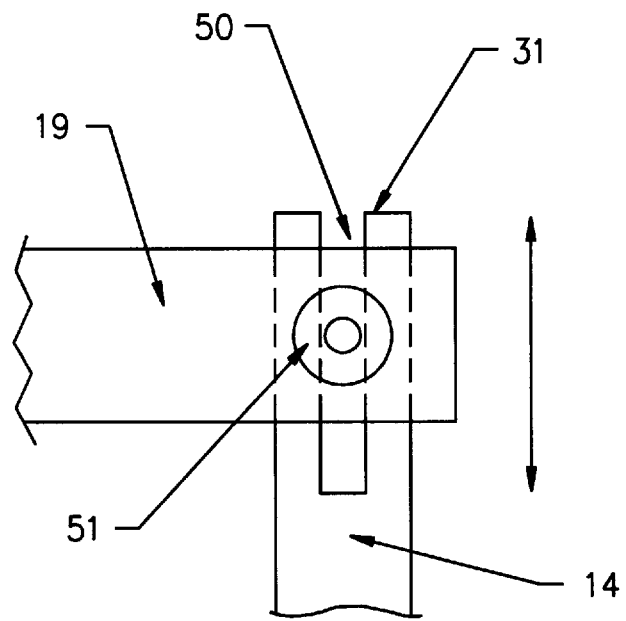

FIGS. 3 and 3 (a) show the connection of the side extender walls to the rear extender wall (10) at the corners (31) at the handle end (16) of the wheelbarrow. The horizontal beams (19) of the side extender walls are parallel to each other. However, the upper side horizontal beam which is not attached to the wheelbarrow rim and is distal to the rim is slightly longer than the side extender beam (19) which is attached to the rim. The extra length is approximately the same as the width of the rear horizontal beams (14). The rear vertical support beam (12) is slightly shorter than the corresponding vertical support beam (17) for the side extender walls. The side extender vertical beams (17) are longer than the rear vertical beams by the width of the rear horizontal beams (14). As can be seen in FIG. 3, this provides an overlap between the uppermost side horizontal beam and the uppermost rear horizontal beam so that a bolt hole with a corresponding bolt and nut (51) will allow the bolt to be extended through the bolt hole in the uppermost side extender beam and through a corresponding slot (50) in the uppermost horizontal beam of the rear extender wall and fastened with a nut. Slots (50) are cut into each end of the rear extender beams which provide for a width adjustment of the side extender walls so that they will fit on wheelbarrows having variations in width. This may be seen more clearly in FIG. 3(a), which is a view from above of one of the connecting corners (31). Here one can see the slot (50) cut in the rear horizontal beams (14). The uppermost horizontal support beam (19) overlaps the horizontal support beams (14) for the rear extender wall. A bolt and nut (51) extends through the beam (19) and fits through the slot (50) to attach on the underside of the horizontal beam (14). Tightening the nut and the bolt (51) provides a secure frictional fit between the horizontal support beam (19) and the horizontal support beam (14). When the nut is loosened, the beams may be slid along the slot in either direction to assure an adjustable fit for different width wheelbarrows as is shown by the directional arrows in FIG. 3(a).

Figure 4:
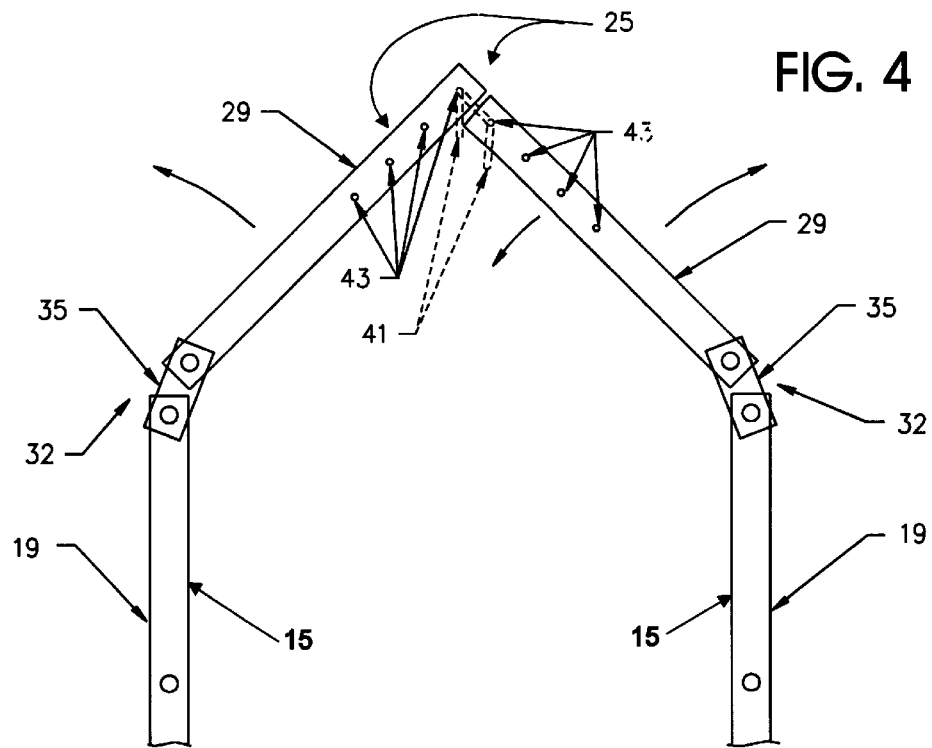
FIGS. 4, 4(a), and 4(b) show the front extender walls, their hinged attachment to the side extender beams, and their detachable connection to each other.
Figure 4A:
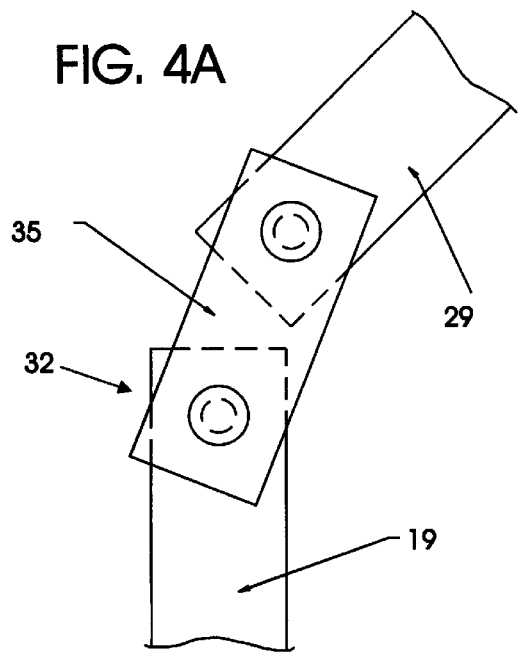
Figure 4B:
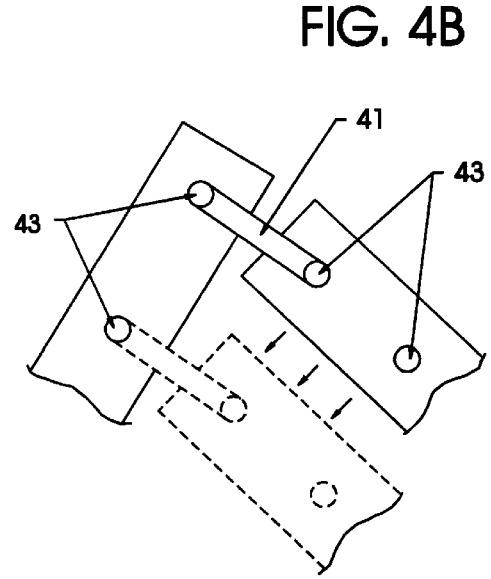

FIG. 4 shows the front extender walls (25) as seen from above and as attached to the side extender walls (15) at the corners (32) of the side extender walls (15) by attaching the horizontal support beam (19) of the side extender wall and the horizontal support beam (29) of the front extender wall to each other by a hinge (35). Both the horizontal support beams that are proximal to the wheelbarrow bin and the horizontal support beams that are distal to the wheelbarrow bin are attached to each other by means of a hinge (35). This attachment may seen in detail in FIG. 4A. The hinge (35) consists simply of a small piece of the same material which was used to construct the horizontal support beams (19) and (29). There are holes drilled in the horizontal support beams (19) and a bolt arrangement is used to connect the hinge to each of the horizontal support beams (19) and (29). The type of bolt arrangement chosen may be tightened for a secure attachment but still allows the hinge to rotate around the point of attachment to each of the horizontal beams (19) and (29). There are a variety of suitable bolt arrangements which will allow the hinge (35) to rotate. Shoulder bolts, push nuts, or self-locking nuts may all be used. One effective way is to use a shoulder bolt where the threaded potion of the bolt screws into a threaded hole in the horizontal beams (19) and (29) for secure attachment and the hinge (35) rotates about the unthreaded portion of the shoulder bolt. These arrangements allows the front extender walls (25) to rotate outward and fold back along the side extender walls (15) or to rotate inward and to attach to each other to form a closed enclosure. FIG. 4 is seen from above so the view is the same for the point of the attachment for the horizontal support beam (19) and (29) whether proximal or distal to the wheelbarrow rim (8).

Because there is variation in the shape of the front of the wheelbarrow bin, as well as in the size of the wheelbarrow bin, provision is made to vary the point of attachment of the two front extender walls (25) to each other. This can be accomplished by a series of spaced holes in the horizontal beams (29) of the front extender walls (25). An appropriately U-shaped hook (41) will slide into the holes (43) as is demonstrated more clearly in drawing 4(b). By varying the location of the hole (43) used with the U-shaped hook (41), one may vary the point of connection of the horizontal support beams (29), thus changing the shape of the assembled wheelbarrow wall extender so that it will conform more closely to different shaped wheelbarrow bins. Some wheelbarrow bins are rather elongated and have almost triangular shape in front, where other bins are more bluntly shaped in the front so that the bin is an approximate square. Because the wheelbarrow wall extender will be used mostly in application for bulky, light items like leaves, mulch, or the like, the wheelbarrow wall extender need not conform exactly to the shape of the wheelbarrow bin in order to perform its designated function of increasing the volume carrying capacity of the wheelbarrow bin. For liquids or for very small granular items like sand that have some of the pouring characteristics of liquids, this will not be effective.

However, it is believed that in almost all circumstances liquids or small granular items having liquid characteristics have density and mass properties that ordinarily make it impractical to need the wheelbarrow wall extender. That is, the wheelbarrow bin without an extender will carry a sufficient mass of these items so that the ability of an individual to handle it will be reached before the volumetric capacity of the wheelbarrow bin will be exceeded. The wheelbarrow wall extender is designed to be used with bulky but light items and a "water tight" fit is not usually required for these items.

Figure 5:
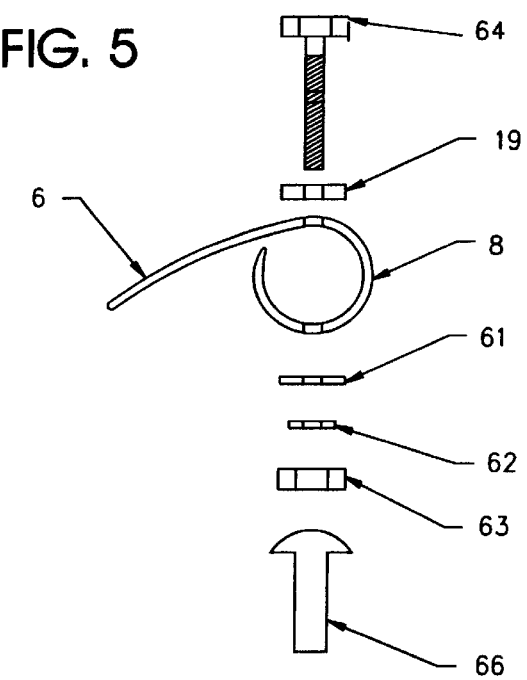
FIG. 5 shows attachment of the wall extender beams to the wheelbarrow rim.

FIG. 5 shows a connection of the wheelbarrow wall extender to the wheelbarrow bin and, more specifically, to the rolled rim of the wheelbarrow (8). Nowadays most wheelbarrows, whether they are of plastic or metal construction, have a rim that is rolled back on itself as is shown in FIG. 5. This provides a secure fastening means for the proximal horizontal support beams of the two side wheelbarrow wall extenders and the one rear wheelbarrow wall extender. The figure shown is for a side wheelbarrow wall extender and, more specifically, for the proximal horizontal beam of one of the side wheelbarrow wall extenders. This has a hole drilled in it for reception of a bolt (64). A hole is also drilled through the wheelbarrow rim (8). The wheelbarrow wall extender proximal horizontal support beam (19) is placed in alignment with the appropriate hole on the wheelbarrow rim (8). The bolt (64) is passed through the hole in the proximal horizontal support beam (19) through the upper and lower hole in the wheelbarrow rim where a portion of the bolt extends beyond the lower portion of the wheelbarrow rim (8). It is then fastened on the wheelbarrow rim by a load spreader (61), a washer (62), and a nut (63). Because of the load spreader (61), the wheelbarrow wall extender support beams can be fastened to plastic as well as to metal wheelbarrow rim (8) assemblies. Additionally, most people who own a wheelbarrow have access to a quarter-inch drill with appropriate size bits for making the hole in the wheelbarrow rim (8). It is anticipated that paper templates would be supplied with the wheelbarrow wall extender when sold for consumer use which would facilitate location of the holes in the wheelbarrow rim (8) by the homeowner. Because a wheelbarrow is sometimes used for such applications as pouring concrete or other liquid materials that could clog or plug the holes in the wheelbarrow rim, a plastic plug (66) will be provided to temporarily fill the holes int he wheelbarrow rim (8) when the wheelbarrow wall extender is not in use.

Figure 5A:
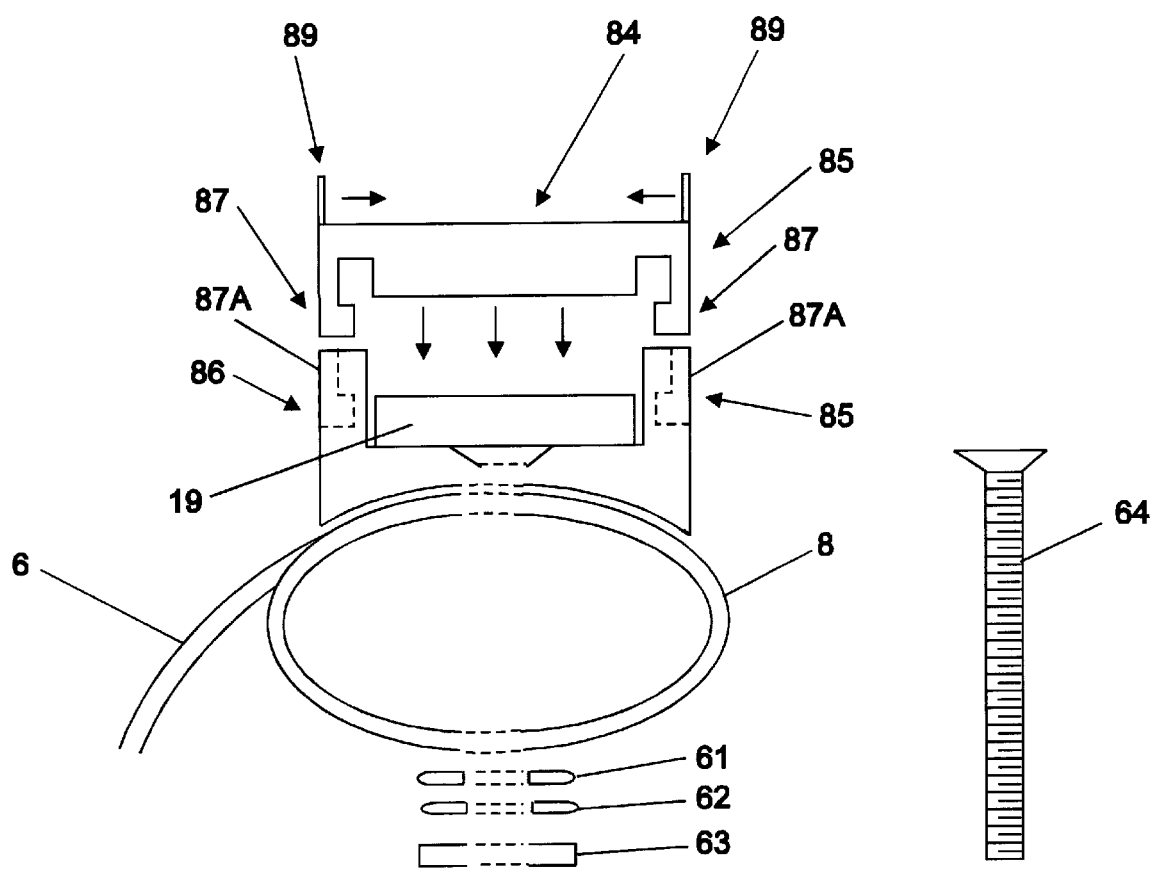
FIG. 5(a) shows an alternate attachment of the wall extender beams to the wheelbarrow rim.

If is possible to mount the wheelbarrow wall extender temporarily to the wheelbarrow rim by the use of a hook like device that fits around the wheelbarrow rim and attaches to the wheelbarrow extender. However, it is believed that these devices allow too much movement in the horizontal support beams proximal to the wheelbarrow rim resulting in unsteadiness and frequent breakdown and need for repair when in use. Some users will place a high value on the wheelbarrow wall extender being easily attached and detached from the wheelbarrow rim. For those users, it is possible to securely attach the wheelbarrow wall extender to the rim of the wheelbarrow by means of a wheelbarrow rim attachment clip shown in FIG. 5(a). The clip (85) consists of a rim piece (86). In the bottom of the rim piece (86) there is a recessed hole for a bolt (64) which is used to attach the rim piece (86) to the wheelbarrow rim by a bolt (64), a load spreader (61), a washer (62), and a nut (63) to the wheelbarrow rim (8). Once the rim piece (86) is secured into place, the wheelbarrow wall extender proximal horizontal support beam (19) is placed in the U-shaped depression in the rim piece (86). The securing piece (84) is then pushed downward as shown by the arrows. Along the sides of the securing piece (84) are tongue-like extensions (87) which snap into place in matching depressions (87A) and the rim piece (86). These tongue-like extensions (87) secure the securing piece (84) in place and also secure the proximal horizontal beam (19) inside the clip (85). When it is necessary to remove the proximal beam (19), one may open the tongue-like extensions (87) by means of an extending piece (89) by pressing the extending pieces inwardly as shown by the arrows, which moves the tongue-like devices away from the bottom clip (86) and out of the matching depressions (87A) where the securing piece (84) is then easily removed. The proximal beam (19) will then lift out of the rim piece (86). Thus, the entire wheelbarrow wall extender is easily clipped into place and equally easily removed.

In many applications where secure attachment is paramount, the preferred embodiment is a nut and bolt arrangement described in FIG. 5. However, where a certain degree of security in attachment can be sacrificed for ease of removable attachment, then the preferred embodiment is that shown in FIG. 5(a).

Figure 6A:
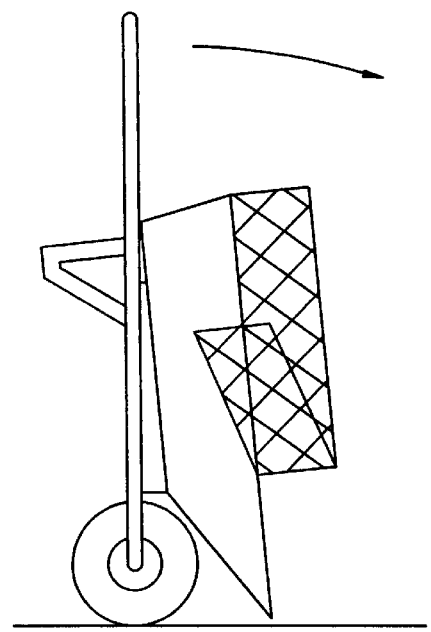
FIG. 6 and 6A shows the present invention mounted on a wheelbarrow with the front gate extender walls open for unloading and shows the present invention mounted on a wheelbarrow with the front gate extender walls open for unloading with the wheelbarrow tipped forward demonstrating the unloading characteristic of a wheelbarrow equipped with this invention.
Figure 6:
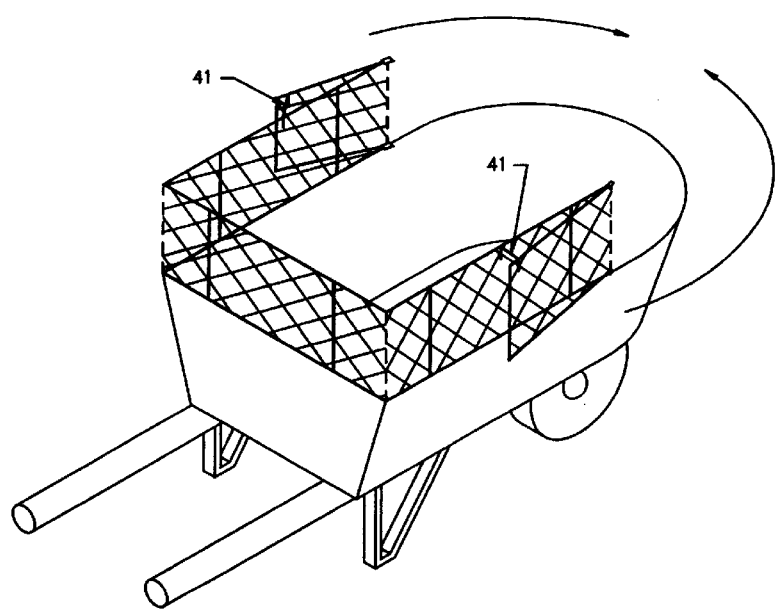

FIG. 6 shows the present invention mounted on a wheelbarrow with the front gate extender walls folded back against the side extender walls and in a position to be tipped forward for unloading. When the front gate extender walls are folded back against the side extender walls they are fastened in the open position by the U-shaped back (41) that are also used to fasten the front gate extender walls to each other. FIG. 6(a) shows a wheelbarrow equipped with this invention with the front gate extender walls folded back against the side extended walls and tipped forward for unloading. It will be readily noticed from FIG. 6(a) that the unloading characteristics of the wheelbarrow is not changed by the addition of the present invention. Folding back the front gate extender walls provides a fully opened front of the wheelbarrow bin. It is slanted at an angle which facilitates loads sliding forward and out of the wheelbarrow bin without requiring extreme angles of tip of the bin by the operator. Thus, the present invention's front gate which open and close provide that the present invention does not change the wheelbarrow emptying characteristics at all.

What is claimed is:

1. An attachment to increase the capacity for a wheelbarrow type carrying bin that rolls on at least one wheel and unloads by a rotational tipping around the wheel axis comprising:
    (a) at least four frames;
    (b) a barrier attached to each of said frames;
    (c) means for adjustably connecting said frames to each other at corners of said frames so as to form a fence-like structure of adjustable width and length with at least one of said means for adjustable connection constructed so as to easily connect and disconnect so that at least one of said frames may disconnect from a point of connection to swing open in a gate like manner, whereby the wheelbarrow type carrying bin, when rotated for emptying, will do so in the direction of the frame that disconnects to swing open in a gate like manner so that none of said frames form a barrier to emptying said wheelbarrow type carrying bin; and,
    (d) means for removably attaching at least three of said frames to a wheelbarrow type carrying bin.

2. An attachment to increase the capacity for a wheelbarrow type carrying bin that rolls on at least one wheel and unloads by a rotational tipping around the wheel axis as recited in claim 1 wherein there are five of said frames.

3. An attachment to increase the capacity for a wheelbarrow type carrying bin that rolls on at least one wheel and unloads by a rotational tipping around the wheel axis as recited in claim 2 wherein said five frames are approximately rectangular in shape.

4. An attachment to increase the capacity for a wheelbarrow type carrying bin that rolls on at least one wheel and unloads by a rotational tipping around the wheel axis as recited in claim 3 wherein a first frame of said five frames is removably attached to a first widthwise portion of a rim of a wheelbarrow type carrying bin that rolls on at least one wheel and unloads by a rotational tipping around the wheel axis; a second frame of said five frames is removably attached to a lengthwise section of a rim of a wheelbarrow type carrying bin that rolls on at least one wheel and unloads by a rotational tipping around the wheel axis; a third frame of said five frames is removably attached to a second lengthwise section of a rim of a wheelbarrow type carrying bin that rolls on at least one wheel and unloads by a rotational tipping around the wheel axis opposite to said first lengthwise section; a fourth frame and a fifth frame of said five frames with said fourth frame adjustably connected to said second frame, and said fifth frame adjustably connected to said third frame, and said fourth frame and said fifth frame removably and adjustably connected to each other so as to be able to swing open in a gate-like manner.

5. An attachment to increase the capacity for a wheelbarrow type carrying bin that rolls on at least one wheel and unloads by a rotational tipping around the wheel axis as recited in claim 4 wherein said first frame, said second frame, and said third frame are adjustably connected to each other at the corners of said frames by slots at corners of said frames and a bolt and nut arrangement wherein said frames are bolted to each other at varying points along said slots.

6. An attachment to increase the capacity for a wheelbarrow type carrying bin that rolls on at least one wheel and unloads by a rotational tipping around the wheel axis as recited in claim 5 wherein said means for removably attaching at least three of said frames to a wheelbarrow type carrying bin that rolls on at least one wheel and unloads by a rotational tipping around the wheel axis is a bolt and nut arrangement with a load spreader and a washer whereby said frames are bolted to a rim of said wheelbarrow type carrying bin that rolls on at least one wheel and unloads by a rotational tipping around the wheel axis.

7. An attachment to increase the capacity for a wheelbarrow type carrying bin that rolls on at least one wheel and unloads by a rotational tipping around the wheel axis as recited in claim 6 wherein said fourth frame and said fifth frame are removably connected to each other by openings in said frames sized for a u-shaped connecting piece.

8. An attachment to increase the capacity for a wheelbarrow type carrying bin that rolls on at least one wheel and unloads by a rotational tipping around the wheel axis as recited in claim 7 wherein said barriers are metal screens.

9. An attachment to increase the capacity for a wheelbarrow type carrying bin that rolls on at least one wheel and unloads by a rotational tipping around the wheel axis as recited in claim 7 wherein said barriers are nets.

10. An attachment to increase the capacity for a wheelbarrow type carrying bin that rolls on at least one wheel and unloads by a rotational tipping around the wheel axis as recited in claim 5 wherein said means for removably attaching at least three of said frames to a wheelbarrow type carrying bin that rolls on at least one wheel and unloads by a rotational tipping around the wheel axis is a first connector piece with a recessed bolt hole in said first connector piece and with slots in the side of said first connector piece; a second connector piece with hook-like projections sized to fit within said slots in said first connector piece whereby said second connector piece is secured to said first connector piece and said frame fits between said first connector piece and said second connector piece to secure said frame to a rim of a wheelbarrow type carrying bin that rolls on at least one wheel and unloads by a rotational tipping around the wheel axis when said first connector piece is bolted to said rim.

11. An attachment to increase the capacity for a wheelbarrow type carrying bin that rolls on at least one wheel and unloads by a rotational tipping around the wheel axis as recited in claim 10 wherein said fourth frame and said fifth frame are removably connected to each other by openings in said frames sized for a u-shaped connecting piece.

12. An attachment to increase the capacity for a wheelbarrow type carrying bin that rolls on at least one wheel and unloads by a rotational tipping around the wheel axis as recited in claim 11 wherein said barriers are metal screens.

13. An attachment to increase the capacity for a wheelbarrow type carrying bin that rolls on at least one wheel and unloads by a rotational tipping around the wheel axis as recited in claim 11 wherein said barriers are nets.

* * * * *